Sept. 20, 1938.  F. HONIG  2,130,739
APPARATUS FOR TREATING THE SURFACE OF SHEET RUBBER
Filed Dec. 6, 1935
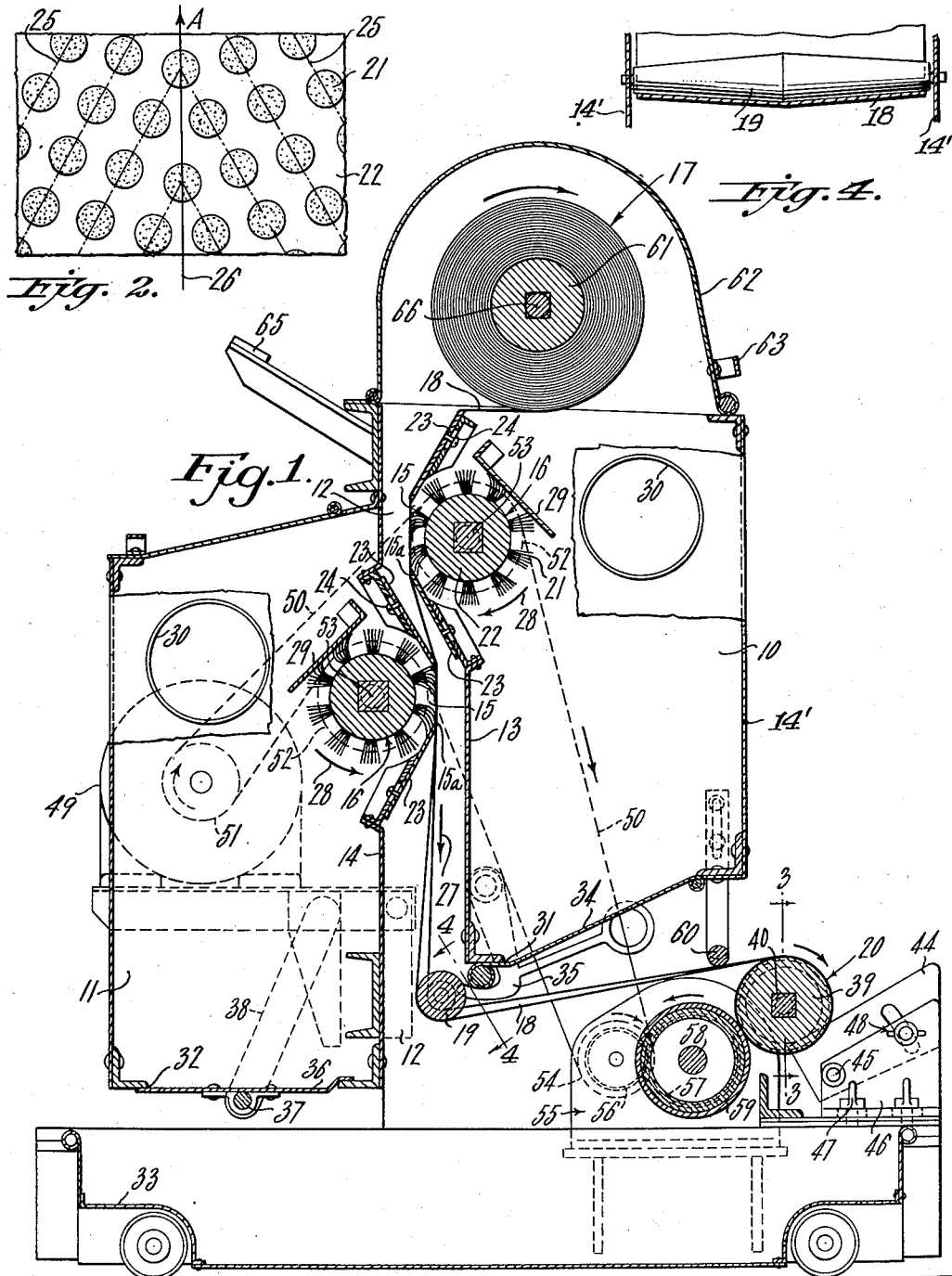
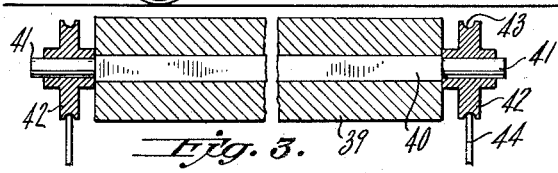
INVENTOR.
FRANK HONIG
BY Walter L. Pipes
ATTORNEY.

Patented Sept. 20, 1938

2,130,739

UNITED STATES PATENT OFFICE 2,130,739

APPARATUS FOR TREATING THE SURFACE OF SHEET RUBBER

Frank Honig, Pawtucket, R. I., assignor to United States Rubber Products, Inc., New York, N. Y., a corporation of Delaware Application December 6, 1935, Serial No. 53,152

10 Claims. (Cl. 91—59)

This invention relates to an improved apparatus for treating the surface of uncured sheet rubber to improve its surface finish and reduce the amount of powder required to prevent surface stickiness, and to remove and recover any excess powder used in such operations.

In the manufacture of sheet rubber powdery material such as starch, zinc stearate or the like is applied to one or both surfaces of the warm tacky sheet upon being formed for the purpose of producing a certain surface finish thereon and for preventing its surface from being tacky or sticky so that it can be handled in the subsequent manufacturing operations.

Heretofore the powder has been sprinkled and/or lightly brushed on the surface and an excess of powder has been used to insure the desired results. The sheet material carrying the excess was then wound on rolls. In the subsequent manufacturing operations the excess was lost and sometimes it caused defective adhesion between the uncured rubber parts in the seam-cutting and cementing operations.

In accordance with this invention the powder is beaten and/or rubbed in the surface of the rubber, which action substantially reduces the amount of powder required to prevent surface stickiness and in some cases the reduction amounts to about one half of that required when the powder is not beaten and rubbed into the surface. Furthermore, this operation produces a very desirable uniform, dull surface finish on the sheet. Preferably an excess of powder is applied to the warm tacky surface of the sheet as it is formed, as by calendering or extruding, and is then wound on a wind-up roll in accordance with the old practice. The sheet is then unwound from the roll while the surface is operated upon by a beating, rubbing and scraping apparatus which causes sufficient powder to penetrate the surface of the uncured sheet to produce the desired uniform dull finish and removes and recovers the excess powder not required to prevent the surface from being sticky. The excess powder is recovered by the apparatus and may be used again.

The foregoing advantages and objects of the invention will be understood by referring to the following description and accompanying drawing, in which:

Fig. 1 is a vertical cross-sectional view of an apparatus illustrating an embodiment of the invention;

Fig. 2 is a portion of the developed surface of the brush shown in Fig. 1 for beating and rubbing in the powder;

Fig. 3 is a cross-sectional view of the wind-up roll shown in Fig. 1 on line 3—3; and Fig. 4 is an elevational view of a detail of the machine taken along line 4—4 of Fig. 1.

The apparatus illustrated in the drawing comprises two powder collecting compartments 10 and 11 separated by a chamber 12 formed between the adjacent walls 13 and 14 of the respective compartments. The compartments and the chamber are enclosed in an outer shell 14'. Openings 15 are formed in the walls 13 and 14, and rotary brushes 16 are mounted in the compartments 10 and 11 so that their peripheries extend through the openings. A roll 17 of uncured sheet rubber, having an excess of powder applied to its surfaces, is rotatably supported over the compartment 10. The web 18 of rubber is unwound from the roll 17 and drawn downwardly through the intermediate chamber 12, and across the openings 15. It passes over a roll 19, tapered towards both ends from the center, and is wound up on a driven wind-up roll 20 which draws the web 18 continuously through the chamber 12.

The openings 15 are formed between converging portions of the walls 13 and 14 which extend into the chamber 12. The transverse edges 15a of the openings 15 act as supports for the opposite sides of the web 18 and guide it in a zigzag path through the chamber 12 so that the web will be held tight between the respective edges. The web 18 is unsupported within the openings 15 on the side opposite to the brushes 16 so that as the brushes are rotated the web may be flexed outwardly and caused to pulsate rapidly by the action of the tufts 21 secured in the core 22 of the brushes. The amplitude of the pulsations may be varied in accordance with the thickness of the web by varying the width of the openings 15 by moving the scrapers 23 and adjusting them in the position desired by the set screws 24.

The tufts 21 may be made of soft felt, or braided cotton wick but preferably of white goat hair. They are preferably arranged on right and left spiral lines 25 (Fig. 2) originating at the center line 26 of the core 22 and extending towards each end of the core and around the core in a direction counter to the direction of rotation of the core 22 as indicated by the arrow A in Fig. 2. This arrangement of the tufts 21 causes the wrinkles in the web 18 to be smoothed out laterally as it is drawn across the openings in the direction indicated by the arrow 27 while the brushes 16 are rotated in the direction indicated by the arrows 28 (Fig. 1).

Cleaning plates 29 are mounted on the sides of the compartments 10 and 11 and extend across the compartments so that they contact with the tufts 21 and cause the powder collected from the web 18 to be freed therefrom.

The excess powder is removed from the web 18 by the beating and brushing action of the tufts 21 and the scraping action of the scrapers 23. The more dense particles of powder settle in the bottom of the compartments 10 and 11 and the less dense particles which are suspended in the air are drawn off with the air through the openings 30 in the sides of the compartments. The suspended particles are recovered in a filter (not shown) while the powder in the bottom of the compartments is recovered by dumping it through the openings 31 and 32 in the bottom of the compartments and into a car 33 underneath.

The opening 31 is controlled by a door 34 which may be released by pulling the hooks 35 to the right which are pivoted on each side of the compartment 10.

The bottom opening 32 in the compartment 11 is controlled by a door 36 pivoted on each side of the compartment at 37 and operated by a handle 38.

Referring to Figs. 1 and 3 the core 39 of the wind-up roll 20 is supported on a removable shaft 40 having rounded ends 41 journaled in the hubs of a pair of wheels 42 each having a groove 43 in its rim cooperating with an adjustable inclined track 44. The tracks 44 are pivoted at 45 on brackets 46 which are adjustable axially of the shaft by slot and clamp connections 47. The tracks may be adjusted about the pivot 45 by the slot and clamp connection 48.

The apparatus is driven from a motor 49 which drives a belt 50, cooperating with the motor shaft pulley 51, pulleys 52 keyed to the shafts 53 of the brushes 16, and a pulley 54 of the gear reduction unit 55. A gear 56 of the reducing unit drives a gear 57 keyed to a shaft 58 of a drum 59 which drives the wind-up roll 20. As the web 18 is wound on the roll 20 it is smoothed out by a vertically adjustable bar 60 secured to the side of the compartment 10.

The core 61 of the roll 17 is the same as that of the wind-up roll core 39. In order to insert the roll 17 in the apparatus, the compartment 10 is provided with a hinged top 62 which may be raised by a handle 63 and rested on a stop 65. The roll 17 is then placed in the top 62 and the shaft 66 is passed through holes in the sides of the top and through the core 61. The round ends are supported in bearings (not shown) in the top.

In the operation of the apparatus the web 18 is continuously drawn by the wind-up roll 20 through the chamber 12 and across the openings 15 in the compartments 10 and 11. It is desirable to maintain the web smoothed out laterally and held tightly across the edges 15a of the openings. Normally the inertia of the roll 17 is sufficient to maintain the web 18 tight, but if necessary a braking action may be applied to the shaft 66 in order to increase the unwinding resistance of the roll 17 and thereby tighten the web. As the web 18 is drawn downwardly the brushes 16 are caused to rotate against the web in a direction counter to its movement. As the web is not supported between the edges 15a of the openings it is caused to pulsate rapidly by the action of the tufts 21. This action removes the excess powder from the surface of the web and rubs in a sufficient quantity to produce a uniform dull finish and also reduces the quantity of adhering powder required to eliminate stickiness. It will also be noted that the scrapers 23 assist in removing the excess powder.

The spiral arrangement of the tufts 21 causes the web to be smoothed out laterally as it passes across the windows 15. The tapered roll 19 also assists in spreading the web laterally. When the web leaves the roll 19 a depression is formed in its center by the high point of the roll 19. This depression is smoothed out by the adjustable bar 60 as the web 18 is wound up on the core 39. As the diameter of the roll 20 on the core 39 increases, the grooved wheels ride upwardly on the tracks 44 in order to provide for the increased distance between the circumference of the drum 59 and the center of the roll 20.

While the preferred modification of this invention has been shown and described herein, it will be understood that changes in the details as shown may be made without departing from the spirit of the invention as defined by the scope of the claims appended hereto.

Having thus described my application what I claim and desire to protect by Letters Patent is:

1. In an apparatus for treating web material, pairs of supports arranged in a zigzag path, means for tightly drawing the material across said supports, means for rubbing and causing said material to pulsate rapidly between said supports, and means for varying the amplitude of the pulsations.

2. In an apparatus for treating web material, spaced transverse supports for said material, means for continuously moving said material along a path and maintaining it in tight suspension between said transverse supports, and means for adjusting the distance between said supports, and a rotary brush arranged between said supports and adapted to contact with and flex said material.

3. In an apparatus for treating rubber web material, transverse supports arranged in a zigzag path for supporting the opposite sides of said material, means for continuously moving said material along said path and maintaining the material in tight suspension between said transverse supports, and rotary brushes arranged between said supports and adapted to flex the material outwardly therefrom, said brushes having tufts arranged thereon and driven at a speed to cause a relatively rapid pulsation of said material between said supports.

4. In an apparatus for treating rubber web material, pairs of transverse supports for said material, means for continuously moving said material along a path and maintaining it in a stretched condition between said pairs of transverse supports, said pairs of supports being arranged on opposite sides of said material and spaced longitudinally along said material in offset relation to one another, a rotary brush extending between each pair of supports and adapted to rotate in the opposite direction to the movement of the material and contact with the opposite surfaces of the material.

5. In an apparatus for removing excess powder from uncured rubber web material, said apparatus having at least two compartments, said compartments having adjacent walls forming a chamber therebetween, each of said adjacent walls having an opening formed therein, a rotary brush mounted in each of said compartments and having its periphery extending into said opening of its respective compartment, means for rotatably supporting a roll of powdered rubber web material, means for unwinding the material and drawing it through said chamber in contact with said brushes and the transverse edges of each opening.

6. In an apparatus for treating web material, said apparatus having two compartments arranged side by side, said compartments having adjacent vertical walls forming a vertical space therebetween, each of said adjacent walls having an opening therein offset vertically from each other, a rotary brush mounted on a horizontal axis in each of said compartments and having its periphery extending into said opening of its respective compartment, means for drawing the web material through said space and across said opening in said adjacent walls.

7. In an apparatus for removing excess powder from uncured rubber web material, said apparatus having at least two compartments, said compartments having adjacent walls forming a chamber therebetween, each of said adjacent walls having outwardly converging wall portions and openings formed in the apex of said converging wall portions, adjustable scrapers adjustably mounted on said converging wall portions and forming the transverse edges of said openings, a rotary brush mounted in each of said compartments and having its periphery extending into said opening of its respective compartment, means for rotatably supporting a roll of powdered rubber web material, means for unwinding the material and drawing it through said chamber in contact with the transverse edges of said openings.

8. In an apparatus for removing excess powder from uncured rubber web material, said apparatus having at least two compartments, said compartments having adjacent walls forming a chamber therebetween, each of said adjacent walls having openings formed therein, rotary brushes mounted in said compartments and having their peripheries extending through said openings, means for rotatably supporting a roll of powdered rubber web material in one of said compartments, means for continuously unwinding said material from said roll and drawing it in a stretched condition across said openings, whereby the excess powder is removed from the opposite surfaces of the web, and means for withdrawing powder suspended in the air from said compartments.

9. In an apparatus for removing excess powder from uncured rubber web material, said apparatus having at least two compartments, said compartments having adjacent walls forming a chamber therebetween, each of said adjacent walls having an opening formed therein, a rotary brush mounted in each of said compartments and having its periphery extending into said opening of its respective compartment, means for rotatably supporting a roll of powdered web material in the closed top of one compartment, means for drawing said material through said chamber in contact with said brushes, and each compartment having doors in its bottom, and means for operating said doors to dump any settled dust into a car underneath said compartments.

10. An apparatus for treating web material, comprising supports for suspending the material therebetween, means for drawing the material over said supports, means for brushing the material between said supports, and means for laterally spreading the material as it is brushed, comprising means on said brush and a roll tapered from the center towards both of its ends and over which the webs are adapted to pass.

FRANK HONIG.